United States Patent
Goetz et al.

(10) Patent No.: US 8,161,084 B2
(45) Date of Patent: Apr. 17, 2012

(54) MEMORY MANAGEMENT OF SOFT REFERENCES

(75) Inventors: Brian Goetz, Williston, VT (US); Antonios Printezis, Burlington, MA (US)

(73) Assignee: Oracle America, Inc., Redwood City, CA (US)

( * ) Notice: Subject to any disclaimer, the term of this patent is extended or adjusted under 35 U.S.C. 154(b) by 520 days.

(21) Appl. No.: 12/389,626

(22) Filed: Feb. 20, 2009

(65) Prior Publication Data
US 2010/0228796 A1     Sep. 9, 2010

(51) Int. Cl.
*G06F 17/30*     (2006.01)
(52) U.S. Cl. .................................................. 707/813
(58) Field of Classification Search .............. 707/2, 3, 707/813; 711/100
See application file for complete search history.

(56) References Cited

U.S. PATENT DOCUMENTS

| | | | | |
|---|---|---|---|---|
| 4,907,151 A | * | 3/1990 | Bartlett | 711/166 |
| 6,131,150 A | * | 10/2000 | DeTreville | 711/173 |
| 6,237,060 B1 | * | 5/2001 | Shilts et al. | 711/100 |
| 2008/0209264 A1 | * | 8/2008 | Morse et al. | 714/7 |

* cited by examiner

*Primary Examiner* — Etienne Leroux
(74) *Attorney, Agent, or Firm* — Polsinelli Shughart PC

(57) ABSTRACT

A garbage collector determines a target amount of heap space to deallocate, estimates an amount of heap space reachable by a plurality of soft references by determining a cumulative size of no more than an exploration bound N number of objects reachable from each soft reference, and deallocates heap space based on the target amount and the estimate of the heap space reachable from the soft references. Deallocating heap space may include clearing at least one soft reference. If the estimate is inaccurate, it may be utilized regardless or modified to account for inaccuracy. The least-recently-used or the largest soft reference may be cleared until the total cleared space reachable exceeds the target amount. By performing a bounded analysis, the garbage collector may be able to make a more informed decision about whether to clear a soft reference without consuming the full amount of resources consumed by an exhaustive analysis.

20 Claims, 8 Drawing Sheets

MEMORY MANAGEMENT OF SOFT REFERENCES

FIELD OF THE INVENTION

This invention relates generally to memory management, and more specifically to methods and systems for garbage collection processing of soft references.

BACKGROUND

Memory is generally allocated for a program (or application) during runtime from a pool of unused memory area called a heap. Garbage collection is a form of memory management for programs during runtime. During runtime, the garbage collector attempts to identify memory allocated to objects that are in not use by the program, so that they may be deallocated (or reclaimed). An object may be in use if the object can be accessed or reached by the program's current state. Since the precise allocation of space in the heap to objects is not known in advance, the memory allocated to objects cannot be accessed via the actual address of the memory. Rather, the memory may be accessed indirectly by the program utilizing references. An object is reachable if some variable or parameter in the program environment references the object, either directly or through references from other reachable objects. Generally, the garbage collector deallocates memory allocated to objects that are not reachable and does not deallocate memory allocated to objects that are reachable.

SUMMARY

Conventional garbage collectors may reclaim objects (thus deallocating memory allocated to the objects) referenced by strong references, weak references, and soft references under different circumstances. Conventional garbage collectors typically do not reclaim objects referenced by soft references, unless there exists sufficient heap pressure (a condition where the heap is running out of memory space to allocate) that additional heap space needs to be deallocated. The present disclosure describes a garbage collection process that performs bounded estimations of the amount of heap space reachable from each soft reference, enabling garbage collectors conforming to aspects of the disclosure to determine more intelligently and efficiently whether or not to reclaim objects referenced by the soft references. As the estimations of the amount of heap space reachable from each soft reference is bounded, the garbage collectors conforming to aspects of the disclosure are able to intelligently and efficiently process soft references without consuming as much resources as an exhaustive investigation.

In an embodiment, a system may include a computing device which may include a processing unit and a memory communicably coupled to the processing unit. The system may perform a computer-implemented method for memory management of soft references. The computer-implemented method may include the operations of a garbage collector determining a target amount of heap space to be deallocated for a program by garbage collection during runtime, estimating an amount of heap space reachable (directly or indirectly) by each of a plurality of soft references in the program by determining for each of the plurality of soft references a cumulative size of no more than a soft reference exploration bound N number of objects reachable from the respective soft reference, and deallocating heap space based on at least the target amount of heap space to deallocate and the amount of heap space reachable by the plurality of soft references. Deallocating heap space may include the operation of clearing at least one of the plurality of soft references based on at least the target amount of heap space to deallocate and the amount of heap space reachable by those soft references.

Determining a target amount of heap space to deallocate may include setting the target amount equal to a fixed size, a percentage of the heap space, and/or a percentage of free space in the heap. The determination of the target amount may be caused by heap pressure. The soft reference exploration bound N may be an integer that is greater than zero, such as five or fifteen. The value of the soft reference exploration bound N may involve a trade-off between the amount of extra processing may be performed during garbage collection and the likelihood that the estimate may be sufficiently accurate for determining whether or not to clear a given soft reference. The value of the soft reference exploration bound N may be higher to obtain more accuracy or lower to obtain greater processing speed. By limiting the estimation of the amount of heap space reachable by a soft reference to the soft reference exploration bound N number of objects, the time consumed by the estimation may be bounded.

The operation of estimating an amount of heap space reachable by each of the plurality of soft references in the program may include determining a set of objects to exclude that are known to be in use by the program (i.e., reachable by a strong reference) and determining a cumulative size of no more than the soft reference exploration bound N number of objects, not included in the set of objects to exclude, reachable from each of the soft references.

The operation of estimating may include determining whether the estimate is inaccurate. If there are fewer than the soft reference exploration bound N number of objects reachable from a soft reference, the estimation may be accurate. If there are more than the soft reference exploration bound N number of objects reachable from the soft reference, the estimation may not be accurate. Even if the estimate is determined to be inaccurate, the inaccurate cumulative size may be utilized as the estimate as it may represent at least a minimum amount of heap space reachable by the soft reference. Alternatively, the operation of estimating may include modifying the estimate to account for inaccuracy, such as by multiplying the cumulative size by a scaling factor or replacing the cumulative size with a constant.

The operation of clearing soft references may include clearing the least-recently-used soft reference until the total amount of heap space that is reachable by the cleared soft references equals or exceeds the target amount of heap space to deallocate. Alternatively, the operation may include clearing soft references with the largest amount of heap space reachable until the total amount of heap space that is reachable by the cleared soft references is at least equal to the target amount of heap space to deallocate. By way of still another alternative, the operation may include clearing the soft references with the largest amount of heap space reachable which have been least recently used until the total amount of heap space that is reachable by the cleared soft references is at least equal to the target amount of heap space to deallocate.

Various forms of garbage collection, such as single-threaded garbage collection, parallel garbage collection, concurrent garbage collection, copying garbage collection, compacting garbage collection, tracing garbage collection, non-moving garbage collection, mark-sweep garbage collection, generational garbage collection, stop-the-world garbage collection, incremental garbage collection, and/or a combination of one or more thereof, may be arranged to conform with aspects of the present disclosure.

The present disclosure may provide systems and methods for memory management of soft references. By performing a bounded analysis, the present disclosure may enable a garbage collector to make a more informed decision about whether to clear a soft reference without consuming the full amount of resources consumed by an exhaustive analysis. Performing a bounded analysis may provide a balance between more informed decisions about whether the clear soft references and the amount of processing consumed to make those more informed decisions.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

DETAILED DESCRIPTION

Figure 1:
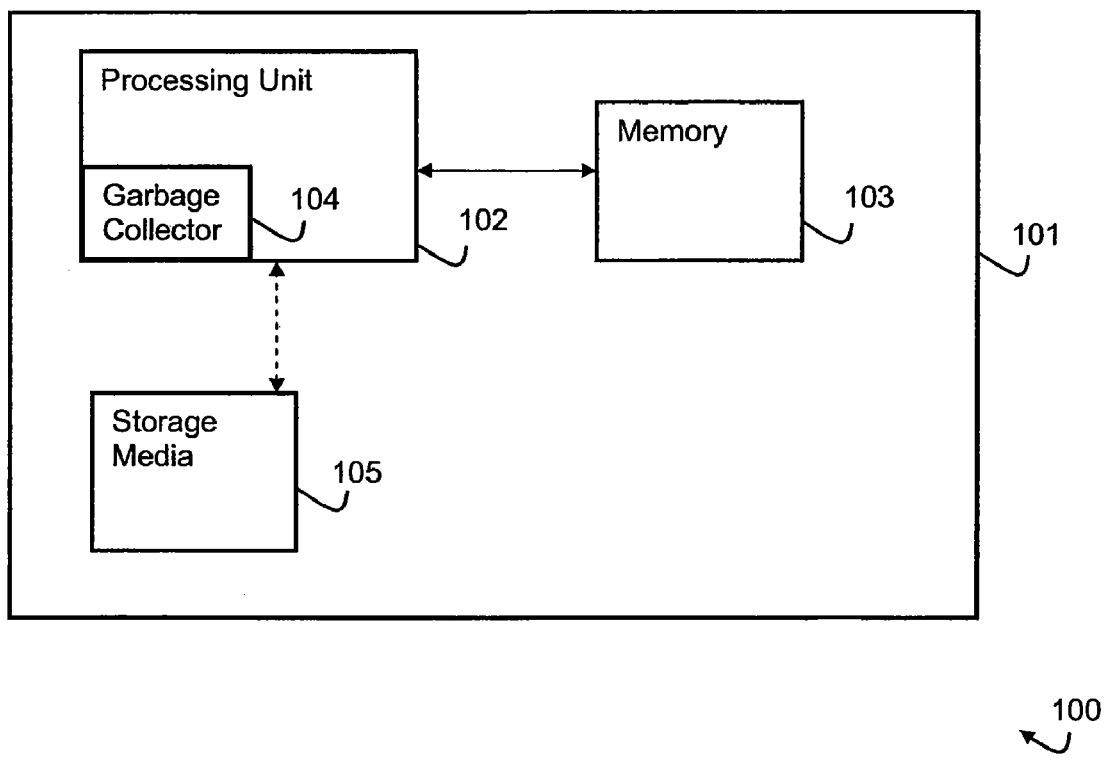
FIG. 1 is a block diagram illustrating a system 100 for memory management of soft references, in accordance with an embodiment of the present disclosure.

Software programs include numerous objects that are allocated memory in the computer system where the program runs. References, including strong references, weak references, and soft references, are used by a program to indirectly access the memory allocated to the objects. Conventional garbage collectors may reclaim objects referenced by strong references, weak references, and soft references under different circumstances. Conventional garbage collectors typically reclaim objects referenced exclusively by weak references, and conversely do not reclaim objects referenced by strong references (as this indicates the objects are in use) or by soft references unless heap space needs to be deallocated because of heap pressure (a condition where the heap is running out of memory space to allocate). The present disclosure describes a garbage collection process that performs bounded estimations of the amount of heap space reachable from soft references, enabling garbage collectors conforming to aspects of the disclosure to determine more intelligently and efficiently whether or not to reclaim objects referenced by the soft references. As the estimations of the amount of heap space reachable from each soft reference is bounded, the garbage collectors conforming to aspects of the disclosure are able to intelligently and efficiently process soft references without consuming as much resources as an exhaustive investigation.

If strong references were the only references, a program would be unable to interact with the memory allocated to an object without preventing the garbage collector from deallocating the memory. For example, the program may use a reference to an object to attempt to determine whether the memory allocated to the object has been deallocated. In such a case if the reference was a strong reference the memory allocated to the object would never be deallocated because the existence of the strong reference indicates to the garbage collector that the object is in use. However, if the reference was a weak reference memory allocated to the object would not be prevented from being deallocated. If the only reference to an object is a weak reference, conventional garbage collectors generally determine that the object is not in use and deallocate memory allocated to the object. Thus, the program may utilize weak references to interact with the memory allocated to objects without preventing the garbage collector from deallocating the memory.

If the only references to an object are soft references, conventional garbage collectors may choose to attempt to reclaim the object by clearing the soft reference(s) which refer to the object. Clearing a soft reference may constitute setting the soft reference to point to null such that it no longer refers to an object. The garbage collector may clear the soft reference (potentially making the previously referred-to object eligible for deallocation) when the object was not created within a certain period of time, the object was not accessed within a certain period of time, and/or the heap is running out of memory space to allocate (i.e., heap pressure). The garbage collector may choose to clear a particular soft reference when the object was created within the certain period of time, the object was accessed within the certain period of time, and/or the heap is not running out of memory space to allocate (i.e., heap pressure). Thus, soft references may provide the program the ability to interact with the memory allocated to an object without preventing the garbage collector from deallocating the memory when certain circumstances are met.

By way of example, a program may read information from a file. The program may store that information in memory so that the program has quick access to the information. However, quick access to the information may not benefit the program if the program cannot continue execution because the program runs out of heap space. Because the information is present in the file, the program can permit the information to be flushed from memory in order to free-up heap space. Time may be consumed by reading the file again, but the extra time is typically preferable to preventing the program from continuing to execute. Therefore, the program may choose to refer to the information in memory utilizing a soft reference. By utilizing a soft reference to refer to the information in memory, the program informs the garbage collector that the information may be kept in memory if heap space is available in order to avoid the time to repeatedly read the information from the file, but the information should be evicted from memory if there is sufficient heap pressure.

When a conventional garbage collector is determining whether to clear one or more soft references based on heap pressure, the garbage collector may determine a target amount of heap space to attempt to deallocate. However, conventional garbage collectors generally do not know how much otherwise unreachable space of the heap (i.e., space in the heap not also reachable from one or more strong references) is reachable from each of the soft references in a program. Thus, the garbage collector does not know how much space in the heap (i.e., memory) would be deallocated (i.e., reclaimed) by clearing one of more of the soft references. As a result, the garbage collector may choose to merely clear all soft references (or may randomly clear one or more soft references) due to lack of information about the amount of space in the heap that may be deallocated by clearing one or more of the soft references. One solution would be to have the garbage collector iteratively ascertain the size of every otherwise unreachable object reachable from each soft reference to determine the amount of space in the heap that may be deallocated by clearing each soft reference. However, the amount of processing consumed to exhaustively make this determination may be prohibitively expensive. Garbage collection consumes resources (such as processing time) that otherwise may be utilized for the execution of the program. The more processing time consumed by the garbage collector, the less processing time is available for program execution. Thus, if the garbage collector consumes excessive processing time, the execution of the program may be adversely impacted (i.e., the execution of the program may be delayed due to a lack of available processing resources). The present disclosure improves the garbage collection process utilizing bounded estimations of heap space reachable from soft references, thus enabling garbage collectors to determine more intelligently whether or not to clear soft references.

FIG. 1 illustrates a system 100 for memory management of soft references, in accordance with an embodiment of the present disclosure. The system 100 may include a computing device 101 which may include a processing unit 102 (which may include a garbage collector component 104) and a memory 103 communicably coupled to the processing unit 102. While the system 100 has been described as including computing device 101, a single processing unit 102, and a single memory 103, it will be understood that system 100 is illustrative and that multiple computing devices 101 (which may be communicably coupled), multiple processing units 102, and/or multiple memories 103 may be utilized without departing from the scope of the present disclosure. The computing device 101 may also include one or more tangible machine-readable storage media, communicably coupled to the processing unit 102 and/or the memory 103, which may include, but are not limited to, magnetic storage media (e.g., floppy diskette), optical storage media (e.g., CD-ROM); magneto-optical storage media, read only memory, random access memory, erasable programmable memory (e.g., EPROM and EEPROM); flash memory, or other types of media suitable for storing electronic information. The computing device 101 may also include (not shown) one or more input and/or output devices (including, but not limited to displays, keyboards, mice, printers, scanners, and so forth), one or more busses (including, but not limited to, universal serial bus, small computer system interface, and so forth), and/or one or more communication components (including, but not limited to, modems, Ethernet adapters, wireless Ethernet adapters, and so forth).

Figure 2:
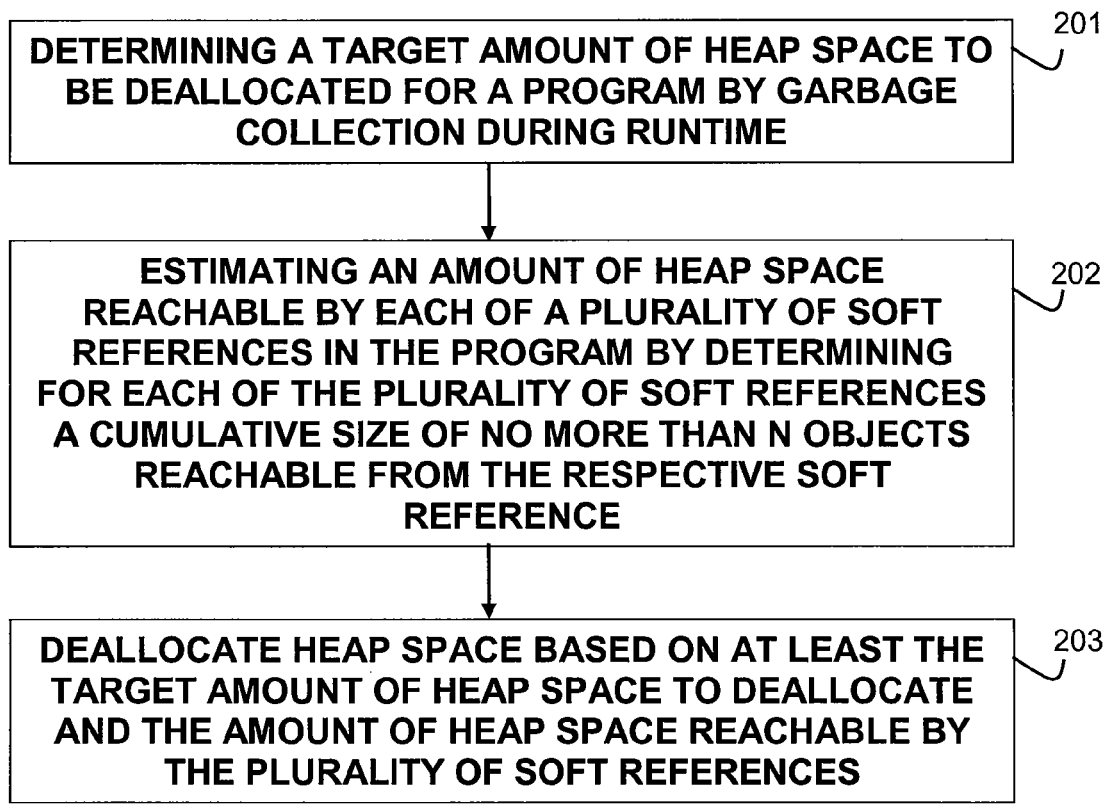
FIG. 2 is a method diagram illustrating a method 200 for memory management of soft references, which may be performed by the system 100 of FIG. 1, in accordance with an embodiment of the present disclosure.

FIG. 2 illustrates a method 200 for memory management of soft references, which may be performed by the system 100, in accordance with an embodiment of the present disclosure. The method 200 may comprise a computer-implemented method. The computer-implemented method may be performed by a processing unit, such as the processing unit 101, executing one or more sets of instructions included in a computer program product stored in a machine-readable medium, such as the memory 103.

In a first operation 201, a garbage collector may determine a target amount of heap space to be deallocated for a program by garbage collection during runtime. Determining a target amount of heap space to be deallocated may include setting the target amount equal to a fixed size (such as 100 kilobytes), a percentage of the heap space (such as five percent of the heap space), and/or a percentage of free space in the heap (such as thirty percent of the space in the heap which has not been allocated). The determination of the target amount may be caused by heap pressure.

In a second operation 202, the garbage collector may estimate an amount of heap space reachable by each of a plurality of soft references in the program. Heap space may be reachable by a soft reference if the soft reference may be utilized, directly or indirectly, to access one or more objects the heap space is allocated to. In one example, to estimate the amount of heap space reachable by each of the plurality of soft references in the program, the garbage collector determines, for each of the plurality of soft references, a cumulative size of no more than a soft reference exploration bound N number of objects reachable from the respective soft reference. The soft reference exploration bound N may be an integer that is greater than zero, such as five or fifteen. By limiting the estimation of the amount of heap space reachable by a soft reference to the soft reference exploration bound N number of objects, the time consumed by the estimation may be bounded. Because the estimation time is bounded, the amount of heap space reachable from soft references (even if that amount may not be completely accurate) may be considered in processing soft references without consuming as much resources as an exhaustive investigation.

In third operation 203, the garbage collector may deallocate heap space based on at least the target amount of heap space to deallocate and the amount of heap space reachable by the plurality of soft references. In some embodiments, the operation 203 of deallocating heap space may include the operation of clearing at least one of the plurality of soft references based on at least the target amount of heap space to deallocate and the amount of heap space reachable by the at least one of the plurality of soft references. Thus, the garbage collector may select one or more soft references to be cleared, potentially resulting in the deallocation of the associated heap space, taking into consideration in the selection the amount of heap space reachable by the cleared soft references and the target amount of heap space to deallocate.

For example, the program may have a heap space of 500 kilobytes, 450 kilobytes of which has already been allocated. Based on the heap pressure (i.e., only 50 kilobytes of the heap remains to be allocated), the garbage collector may determine to deallocate twenty percent of the heap space, or 100 kilobytes in order to alleviate the heap pressure. The garbage collector may estimate that 200 kilobytes of heap space is allocated to objects only referenced by soft references. The garbage collector may then determine to clear fifty percent heap space allocated to objects only referenced by soft references based on the percentage of heap space the garbage collector determined to deallocate (100 kilobytes) and the estimated amount of heap space allocated to objects only referenced by soft references (200 kilobytes).

Referring again to operation 202, the value of the soft reference exploration bound N may involve a trade-off between the amount of extra processing that would be performed during garbage collection and the likelihood that the estimate may be sufficiently accurate for determining whether or not to clear a given soft reference. Hence, the value of the soft reference exploration bound N may be made higher to obtain more accuracy or lower to obtain faster processing speed. The method of FIG. 2 may impose some extra (though bounded) work on the garbage collector, as compared to not considering the amount of space reachable from soft references in determining which soft references to clear. However, the extra work may only be imposed on the garbage collector if soft references are used. In the event a program does not utilize soft references, method 200 may not be performed and the garbage collector may not need to expend the extra work for the program.

The operation 202 of estimating an amount of heap space reachable by each of the plurality of soft references in the program may include determining a set of objects to exclude that are in use (i.e., reachable by a strong reference) and determining a cumulative size of no more than the soft reference exploration bound N number of objects reachable from one of the soft references that are not included in the set of objects to exclude. Thus, the estimation of the amount of heap space reachable from a soft reference may not include objects that are reachable from the soft reference but are considered in use. Objects that are reachable from the soft reference but are considered in use would not be deallocated even if the soft reference were cleared, as they are in use. In this way, the estimate of the amount of heap space reachable by a soft reference is not over-inflated by counting heap space which is known to be strongly reachable and therefore would not be deallocated regardless of which soft references were cleared.

If there are fewer than the soft reference exploration bound N number of objects reachable from a given soft reference, the estimation of operation 202 may be accurate as the cumulative size of the no more than the soft reference exploration bound N of objects reachable from the soft reference may include the size of all of the objects reachable from the soft reference. If there are more than the soft reference exploration bound N number of objects reachable from the soft reference, the estimation of 202 may not be accurate as the estimate may not include the size of at least one otherwise unreachable object that is reachable from the soft reference. The operation 202 of estimating the amount of heap space reachable by each of the plurality of soft references may include determining whether the estimate is inaccurate based on whether the estimate is based on more than or fewer than the soft reference exploration bound N number of objects. However, even though the estimate may be determined to be inaccurate, it may constitute a lower bound to the amount of heap space that is reachable from the soft reference. For example, 300 kilobytes of heap space may be estimated as reachable from a soft reference, contained in the soft reference exploration bound N number of objects reachable from the soft reference. In this example, 500 kilobytes may actually be reachable from the soft reference, contained in the soft reference exploration bound N+3 number of objects reachable from the soft reference. Even though the 300 kilobytes estimate may be determined to be inaccurate, as it is the size of fewer than all the objects reachable from the soft reference, 300 kilobytes may constitute a lower bound as there is at least 300 kilobytes of heap space reachable from the soft reference. Thus, the amount of heap space reachable from the soft reference may not be smaller than the inaccurate estimate.

Inaccurate estimates may not necessarily produce suboptimal results. In some cases, a program may include a large number of soft references, each of which reference a small object graph. In these cases the program may be utilizing soft references to cache individual objects. In other cases, the program may include a small number of soft references, each of which points to a large object graph. In these cases, a single soft reference may point to the cache as a whole. In the former cases, method 200 may provide an exact inexpensive analysis, as the graphs to be traversed are shallow. In the latter cases, bounded analysis may quickly indicate the presence of a large amount of data beyond the bound. Thus, even inaccurate estimates may provide useful, if inaccurate, information about soft references.

Even though the estimate of the amount of heap space reachable by a soft reference may be determined to be inaccurate, the inaccurate cumulative size of the no more than the soft reference exploration bound N number of objects reachable from a soft reference may be utilized as the estimate as it may represent at least a minimum amount of heap space reachable by the soft reference. Alternatively, the operation 202 of estimating the amount of heap space reachable by the soft reference may include modifying the estimate to account for inaccuracy if the estimate is determined to be inaccurate. If the estimate is determined to be inaccurate, the cumulative size of the no more than the soft reference exploration bound N number of objects reachable from the soft reference may be multiplied by a scaling factor. For example, the garbage collector may adaptively determine a scaling factor utilizing profiling data of previous garbage collection cycles. The garbage collector may determine the scaling factor by dividing an actual amount of space deallocated by one or more previous garbage collection cycles by the previous total estimated heap space reachable by one or more soft references that were cleared by the one or more previous garbage collection cycles. In this case, the scaling factor may represent an adaptive ratio of how much heap space the garbage collector has actually been able to reclaim to the potential heap space the garbage collector has estimated may potentially be reclaimed by clearing the soft references. The garbage collector may smooth the empirically derived scaling factor utilizing a suitable filtering technique before multiplying the cumulative size of the no more than the soft reference exploration bound N number of objects reachable from the soft reference by the scaling factor. In another example, statistical analysis of soft references may have been performed during the execution of a variety of programs which indicated that soft references that are able to reach more than the soft reference exploration bound N number of objects are generally, on average, able to reach a total amount of heap space three times larger than they are able to access through the soft reference exploration bound N number of objects. In such a case, if the estimate is determined to be inaccurate, the cumulative size of the no more than the soft reference exploration bound N number of objects reachable from the soft reference may be multiplied by a scaling factor of three, which may improve the accuracy of the estimate. Alternatively, if the estimate is determined to be inaccurate, the cumulative size of the no more than the soft reference exploration bound N number of objects reachable from the soft reference may be replaced with a constant. For example, statistical analysis of soft references may have been performed during the execution of a variety of programs which indicated that soft references that are able to reach more than the soft reference exploration bound N number of objects generally are able to reach an average of 300K of heap space. In such a case, if the estimate is determined to be inaccurate, the cumulative size of the no more than the soft reference exploration bound N number of objects reachable from the soft reference may be replaced with 300K, which may improve the accuracy of the estimate.

The operation of clearing the at least one of the plurality of soft references may include clearing the least-recently-used soft references until the total amount of heap space that is reachable by the cleared soft references equals or exceeds the target amount of heap space to deallocate. A list of the soft references may be generated and ordered in a least-recently used order. Then, one or more of the soft references may be cleared, based on the ordering of the list, until the total space that is estimated reachable by the cleared soft references equals or exceeds the target amount of heap space to deallocate. In this way, garbage collection may attempt to deallocate the desired amount of heap space by clearing the soft references which may be least likely to be needed by virtue of being the least recently used.

Alternatively, the operation of clearing the at least one of the plurality of soft references may include clearing soft references with the largest amount of heap space reachable until the total amount of heap space that is reachable by the cleared soft references is at least equal to the target amount of heap space to deallocate. A list of the soft references may be generated and ordered in order of decreasing estimated amount of heap space reachable. Then, one or more of the soft references may be cleared, based on the ordering of the list, until the total space that is estimated reachable by the cleared soft references equals or exceeds the amount of heap space to deallocate. In this way, garbage collection may attempt to deallocate the desired amount of heap space by clearing the fewest soft references reasonably possible, thus consuming as little time as possible to deallocate the desired amount of heap space and preserving as many of the soft references as is reasonably possible.

In other embodiments, the operation of clearing the at least one of the plurality of soft references may include approaches for clearing the at least one of the plurality of soft references other than clearing least-recently-used soft references or clearing soft references with the largest amount of heap space reachable.

Various forms of garbage collection, such as single-threaded garbage collection, parallel garbage collection, concurrent garbage collection, copying garbage collection, compacting garbage collection, tracing garbage collection, non-moving garbage collection, mark-sweep garbage collection, generational garbage collection, stop-the-world garbage collection, incremental garbage collection, and/or a combination of one or more thereof, may be arranged to conform with aspects of the present disclosure. Single-threaded garbage collection may involve utilizing a single thread for the garbage collection process. Parallel garbage collection may involve parallelizing the garbage collection process by utilizing multiple threads to execute the garbage collection process. Concurrent garbage collection may constitute running the garbage collection process substantially concurrently with the execution of the program. Copying garbage collection may encompass garbage collection processes that copy in-use objects from the heap space into a new heap space. Compacting garbage collection may include garbage collection processes where in-use objects are moved to contiguous locations in the heap. Tracing garbage collection may constitute determining which objects are reachable or potentially reachable and discarding all remaining objects. Non-moving garbage collection may involve releasing objects that are not in use without altering memory locations. Mark-sweep garbage collection may involve marking in-use objects and then releasing unmarked objects. Generational garbage collection may encompass dividing objects into generations based on time from creation and treating the different generations of objects differently during the garbage collection process. Stop-the-world garbage collection may constitute halting execution of the program during garbage collection. Incremental garbage collection may include interleaving the garbage collection process with execution of the program.

Figure 3:
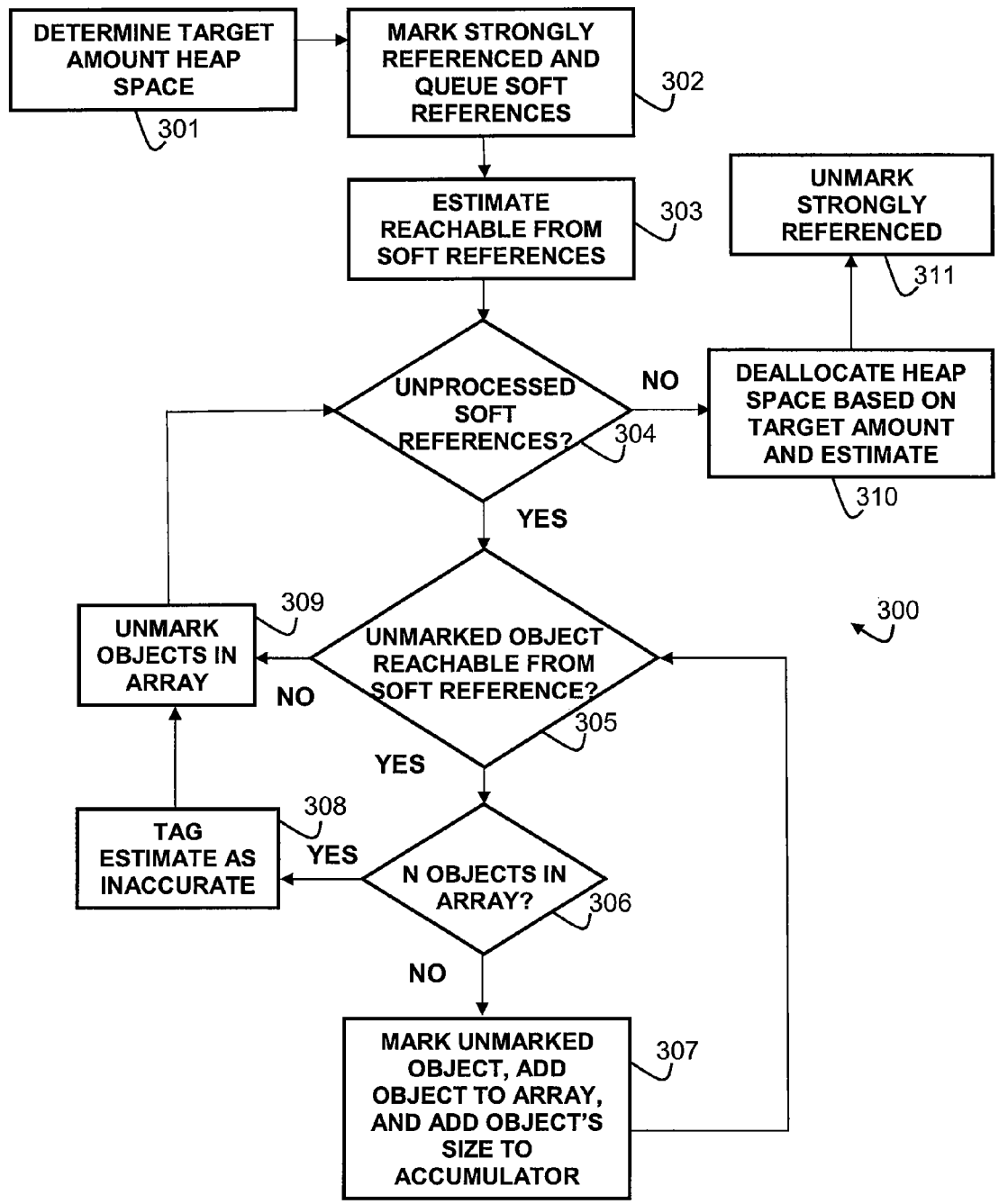
FIG. 3 is a flow chart illustrating an example flow of an implementation of the method of FIG. 2, in accordance with an embodiment of the present disclosure.

FIG. 3 illustrates the flow of an example implementation of the method of FIG. 2, in accordance with an embodiment of the present disclosure. At block 301, a garbage collector may determine a target amount of heap space to be deallocated for a program during runtime. At block 302, the garbage collector may mark strongly referenced objects and queue soft references. At block 303, the garbage collector may estimate the amount of space reachable from each of the queued soft references. At block 304, the garbage collector may determine if a soft reference in the queue of soft references has not been processed. If all soft references have been processed, the flow may proceed to block 310. If a soft reference in the queue of soft references has not been processed, the flow may proceed to block 305 and the garbage collector may process the soft reference.

At block 305, the garbage collector may determine whether there is an unmarked object directly or indirectly reachable from the soft reference. If there are no unmarked objects reachable from the soft reference, the flow may proceed to block 308. If there are unmarked objects reachable from the soft reference, the flow may proceed to block 306. At block 306, the garbage collector may determine if an array of objects for the soft reference contains a soft reference exploration bound N number of objects. If the array contains the soft reference exploration bound N number of objects, the flow may proceed to block 308. If the array does not contain the soft reference exploration bound N number of objects, the flow may proceed to block 307. At block 307, the garbage collector may mark the unmarked object, add the object to the array, and add the object's size to an accumulator. The flow may then proceed to block 305.

At block 308, the garbage collector may tag the estimate as inaccurate. The flow may then proceed to block 309. At block 309, the garbage collector may unmark objects in the array. The flow may then proceed to block 304.

At block 310, the garbage collector may deallocate space in the heap based on the target amount of heap space to be deallocated and the estimates of the amount of space reachable from each of the queued soft references. The operation of deallocating space in the heap may include clearing one or more soft references based on the target amount of heap space to be deallocated and the estimates of the amount of space reachable from each of the queued soft references. The flow may then proceed to block 311. At block 311, the garbage collector may unmark the strongly referenced objects and the soft references.

Figure 4A:
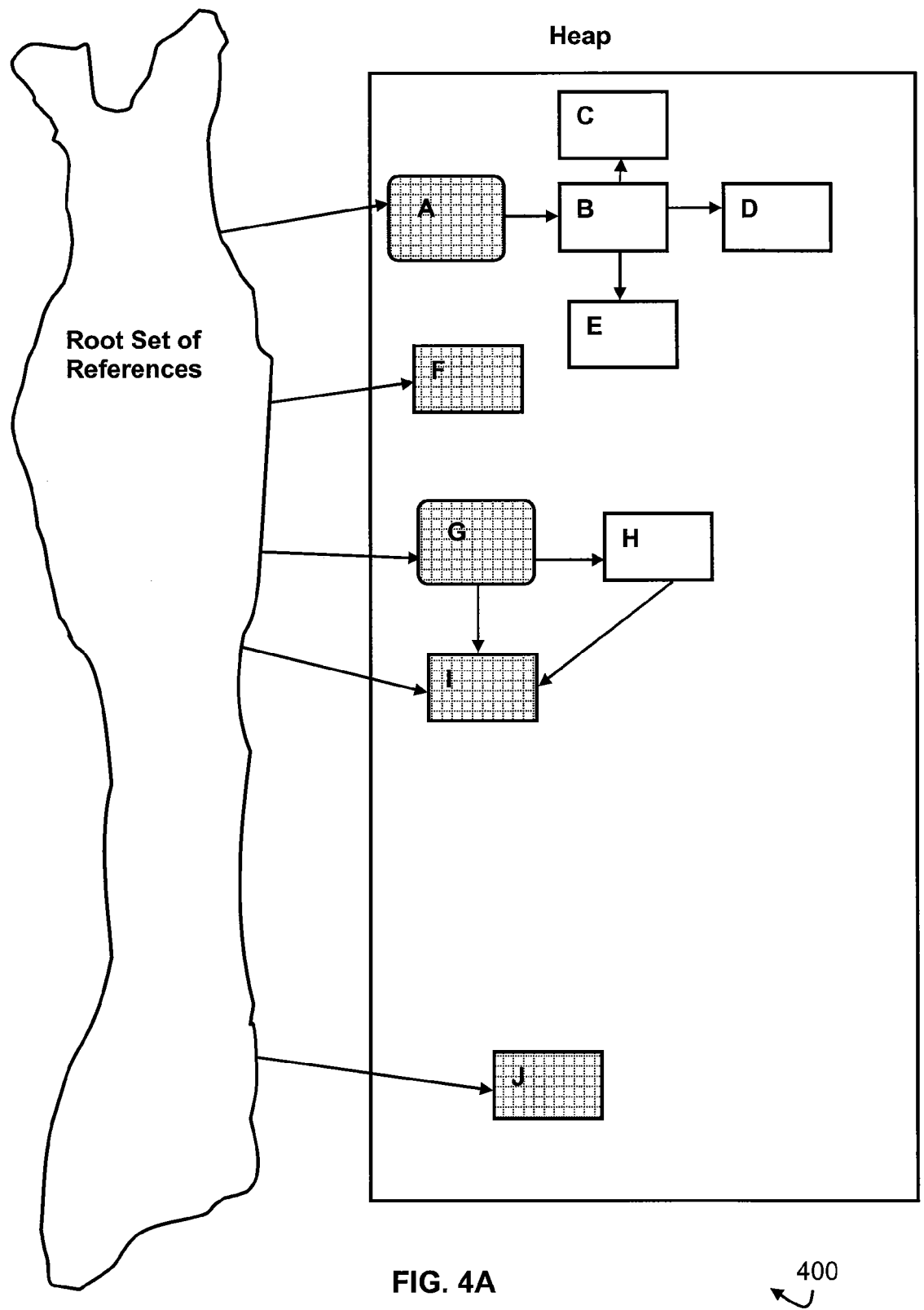
FIG. 4A is a diagram illustrating garbage collection for a program.

By way of example of the method of FIG. 2, FIG. 4A is a diagram illustrating garbage collection for a program. In this example, the program may be a Java™ program and the garbage collection may be performed by a single-threaded mark-sweep garbage collector configured to conform with aspects of the method of FIG. 2 or some alteration thereof. The root set of references may include references from anywhere in the call stack of the program (local variables and parameters in functions currently being invoked) and any global variables. The root set of references may reference objects in the heap. As illustrated, the heap includes memory that has been allocated to objects A-J.

A target amount of heap space for the program to be deallocated by the garbage collection may be determined. The target amount to deallocate may be determined based on a fixed size, a percentage of the heap space, and/or a percentage of the heap space. In this example, the garbage collector may attempt to deallocate a fixed size of 50K.

During a global marking phase, the garbage collector may mark objects which are in use (i.e., referenced by strong references), queue up soft references without marking their referents, and calculate the amount of space in the heap that was marked. Objects F, I, and J are shaded in FIG. 4A to illustrate that they have been marked by the global marking phase and thusly are referenced by strong references in the root set of references. Object F may have a size of 25K (kilobytes), object I may have a size of 300K, and object J may have a size of 10K. The garbage collector may determine that the amount of space in the heap that was marked was 335K. Objects A and G may be soft references that may have been marked and queued up during the global marking phase. In Java™, soft references may be implemented as reference objects. A reference object may encapsulate a reference to some other object, which is called the referent. Objects B, C, D, E, and H are objects which have been allocated memory in the heap that are reachable through soft reference A or G, respectively.

The garbage collector may then iterate over the queued up soft references. For each of the queued up soft references, the garbage collector may perform a local and bounded marking phase to determine how much space is reachable from the soft reference. The local and bounded marking phase may determine a cumulative size of no more than a soft reference exploration bound N number of objects reachable from the soft reference. The soft reference exploration bound N may constitute an integer that may be one or greater. In this example, the soft reference exploration bound N may be three. The local and bounded marking phase may determine the cumulative size of no more than the soft reference exploration bound N number of objects reachable from the soft reference that have not already been marked as in-use by the global marking phase. The garbage collector may utilize an array of fixed length N. The garbage collector may utilize the array to keep track of objects marked during the local and bounded marking phase. The garbage collector may visit up to the soft reference exploration bound N number of objects reachable from the soft reference, mark each object, add the address of the object to the array, and add the size of the object to an accumulator. At the end of the local and bounded marking phase, the objects marked during the local and bounded marking phase may be unmarked. The garbage collector may unmark the objects whose addresses are recorded in the array.

Figure 4B:
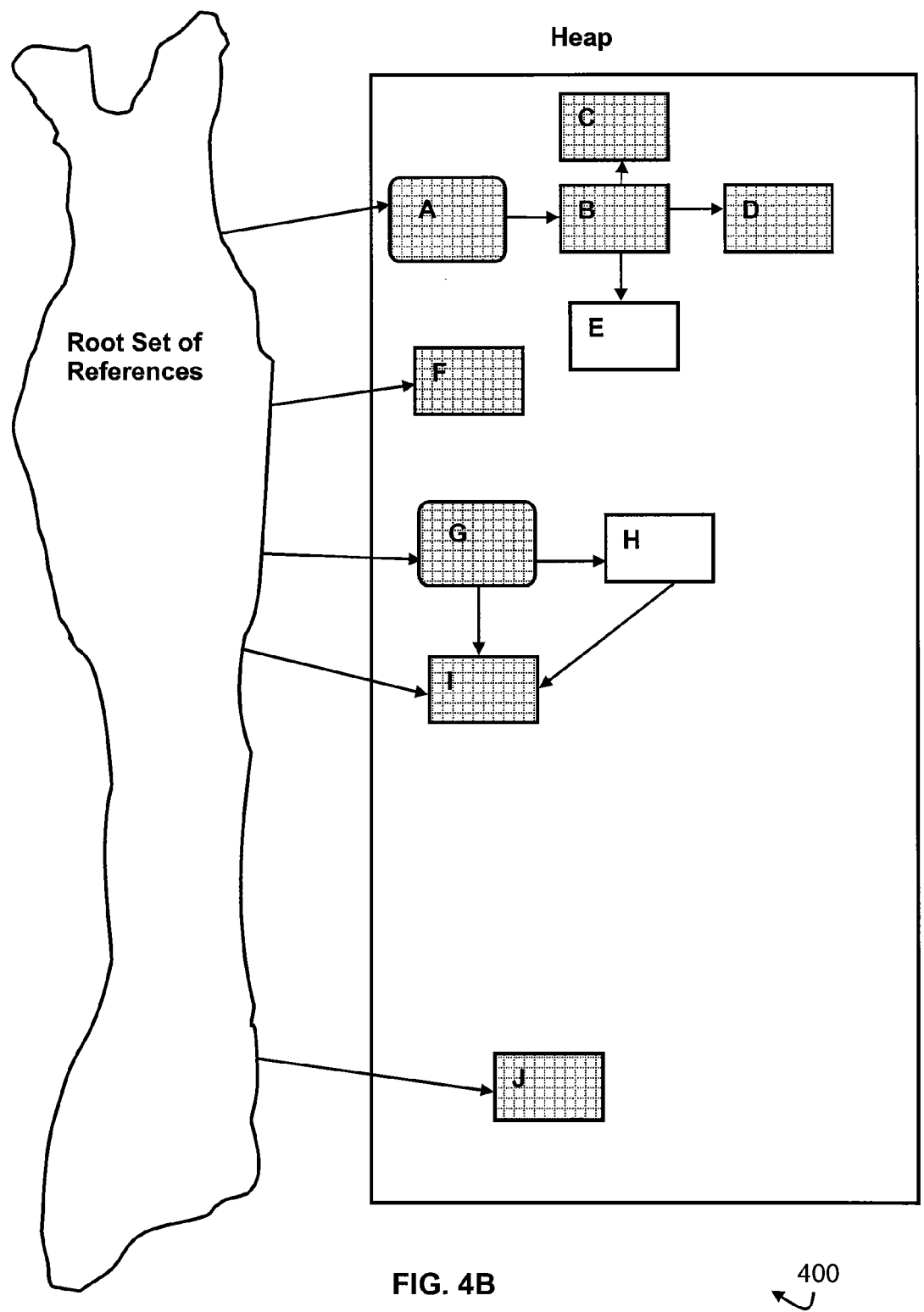
FIG. 4B is a diagram illustrating garbage collection for a program.
Figure 4C:
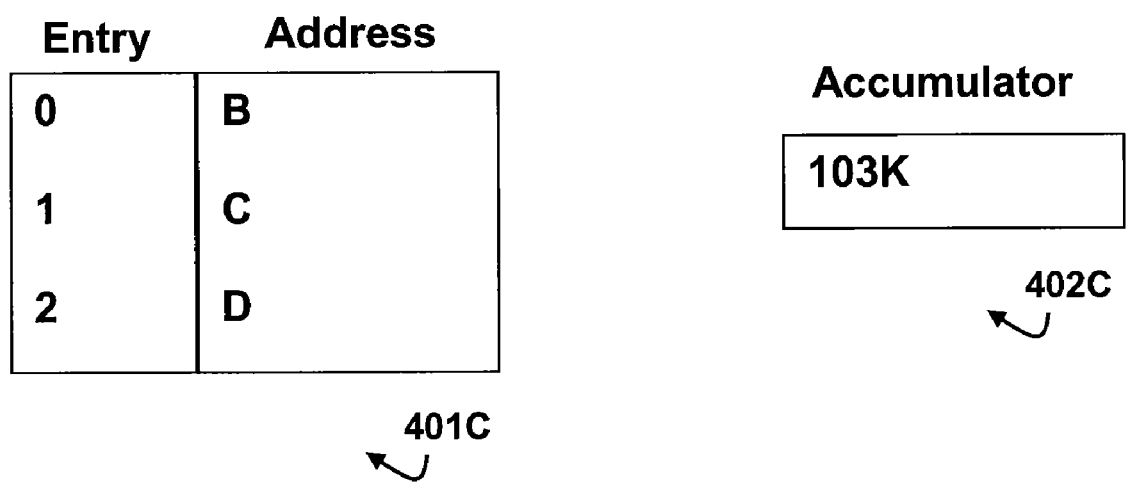
FIG. 4C is a diagram illustrating garbage collection for a program.

FIG. 4B illustrates the local and bounded marking phase to determine how much space is reachable from the soft reference A. During the local and bounded marking phase, objects B, C, and D may be marked because they are reachable from the soft reference A. As illustrated in FIG. 4C, the addresses for objects B, C, and D may be added to array 401C which is of fixed length N, or three. The sizes of objects B, C, and D may be added to accumulator 402C. In this example, object B may have a size of 1K (kilobyte), object C may have a size of 2K, object D may have a size of 100K and object E may have a size of 20K. Thus, at the end of the local and bounded marking phase for the soft reference A, the accumulator 402C may have a value of 103K. The estimated amount of heap space reachable from the soft reference A is therefore 103K, or the value of the accumulator 402C. Object E may not be marked, the address of object E may not be added to the array 401C, and the size of object E (20K) may not be added to the accumulator 402C as N (i.e., three) objects (B, C, and D) reachable from the soft reference A have already been visited. Then, the garbage collector may utilize array 401C to unmark objects B, C, and D (as seen in FIG. 4A).

The estimated amount of heap space reachable from the soft reference A of 103K may not be accurate. The actual amount of heap space reachable from the soft reference A may be 123K (i.e., the size of objects B, C, D, and E). Because the estimated amount of heap space reachable from the soft reference A (i.e., the value of the accumulator 402C) is the size of only the soft reference exploration bound N number of objects, it may be determined that the estimated amount of heap space reachable from the soft reference A is not accurate.

As the estimated amount of heap space reachable from the soft reference A is determined to be inaccurate, the estimate may be modified to account for the inaccuracy, such as by multiplying the estimate by a scaling factor or replacing the estimate with a constant. However, in this example the garbage collector utilizes the estimate even though the estimate is inaccurate because even though 103K is not the full amount of heap space reachable from the soft reference A, there is at least 103K of heap space reachable from the soft reference A.

Figure 4D:
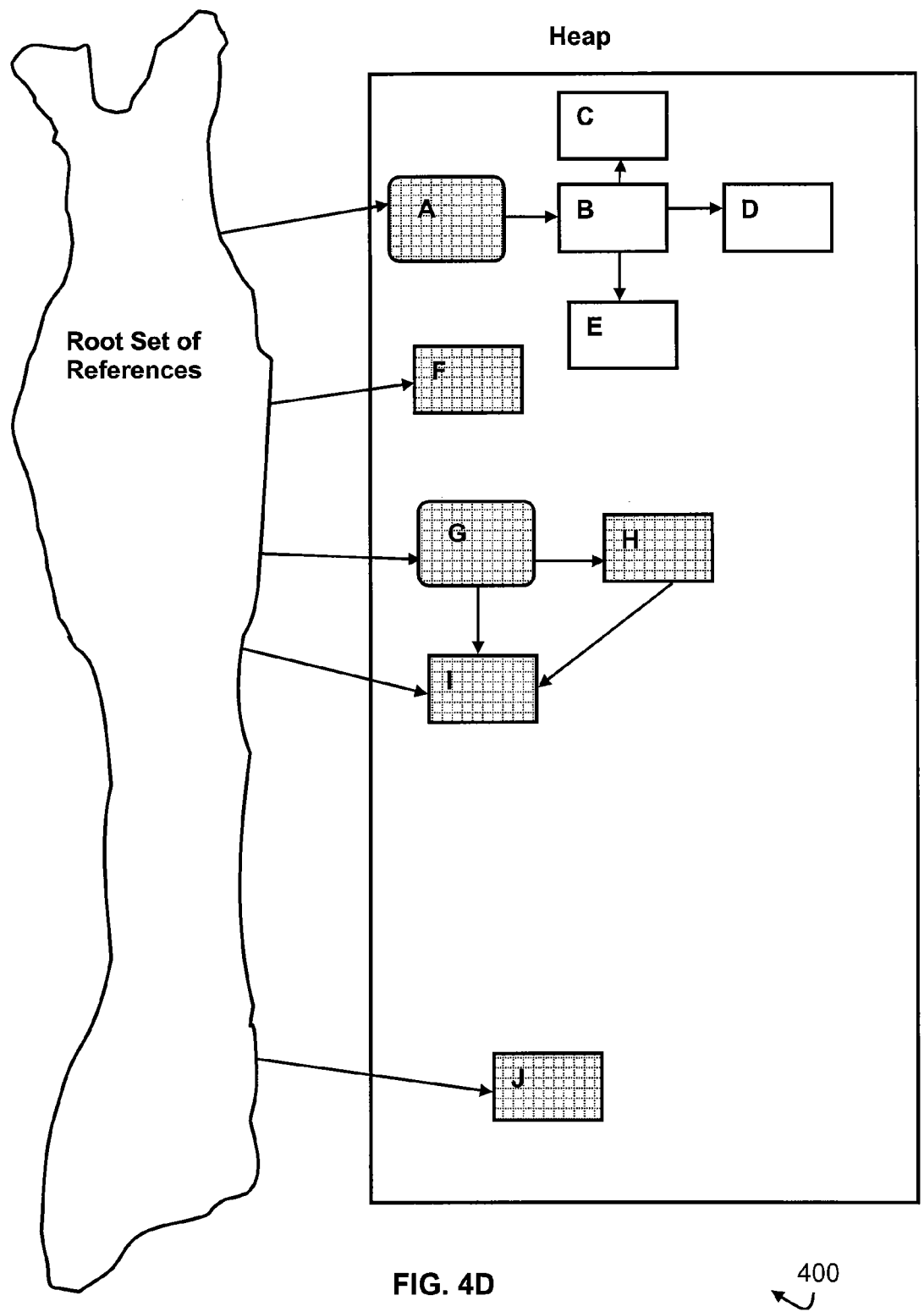
FIG. 4D is a diagram illustrating garbage collection for a program.
Figure 4E:
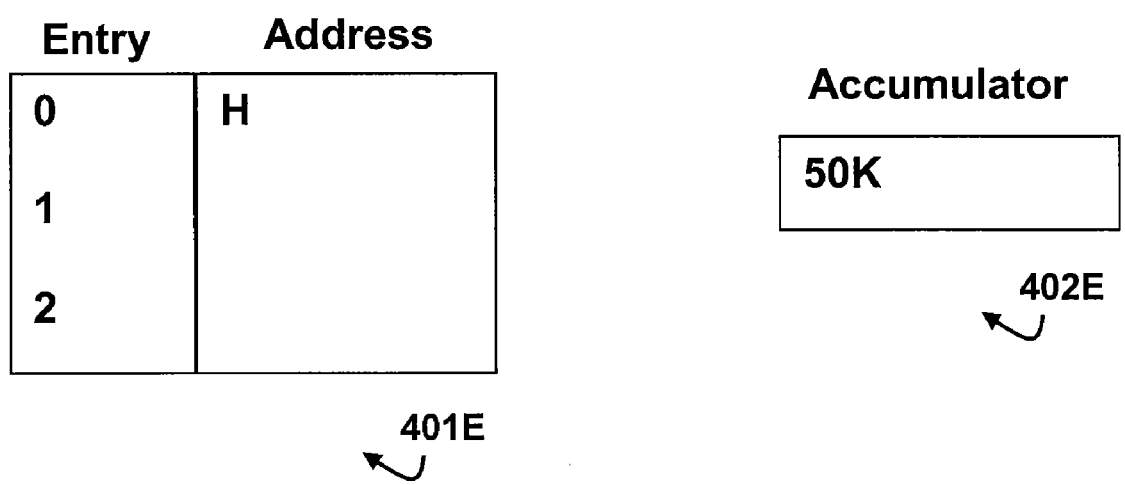
FIG. 4E is a diagram illustrating garbage collection for a program.

FIG. 4D illustrates the local and bounded marking phase to determine how much space is reachable from the soft reference G. During the local and bounded marking phase, object H may be marked because it is reachable from the soft reference G. As illustrated in FIG. 4E, the addresses for object H may be added to array 401E which is of fixed length N, or three. The sizes of object H may be added to accumulator 402E. In this example, object H may have a size of 50K. Thus, at the end of the local and bounded marking phase for the soft reference G, the accumulator 402E may have a value of 50K. The estimated amount of heap space reachable from soft reference G is therefore 50K, or the value of the accumulator 402E. Object I is not marked, the address of object I is not added to the array 401E, and the size of object I may not be added to the accumulator 402E even though object I is reachable from the soft reference G and/or the object H because the object I has already been marked by the global marking phase as in-use. Then, the garbage collector may utilize array 401E to unmark object H (as seen in FIG. 4A).

The garbage collector may clear one or more of soft references A and G at least based on the target amount of heap space to deallocate and the estimated amount of heap space reachable by each of the soft references A and G.

For example, the garbage collector may clear the least-recently-used soft reference until the total estimated amount of heap space reachable by the cleared soft references meets or exceeds the target amount of heap space to deallocate. The garbage collector may order the soft references A and G in a list in a least-recently used order. In this example, the soft reference A has been used most recently so the list may be ordered with the soft reference G first and the soft reference A second. Based on the list, the garbage collector may clear the least-recently-used soft reference, or the soft reference G. The estimated amount of heap space reachable by the cleared soft reference G is 50K. This meets the target amount to deallocate of 50K and the garbage collector may cease clearing soft references, leaving the soft reference A uncleared.

By way of an alternative example, the garbage collector may clear soft references with the largest amount of heap space reachable until the total amount of heap space reachable by the cleared soft references meets or exceeds the target amount of heap space to deallocate. The garbage collector may order the soft references A and G in a list in order of decreasing estimated amount of heap space reachable. The estimated amount reachable of the soft reference A is 103K. The estimated amount reachable of the soft reference G is 50K. Thus, the list may be ordered with the soft reference A first and the soft reference G second. Based on the list, the garbage collector may clear the soft reference with the largest amount of heap space reachable, or the soft reference A. The estimated amount of heap space reachable by the cleared soft reference A is 103K. This exceeds the target amount to deallocate of 50K and the garbage collector may cease clearing soft references, leaving the soft reference G uncleared.

The present disclosure may provide systems and methods for memory management of soft references. By performing a bounded analysis, the present disclosure may enable a garbage collector to make a more informed decision about whether to clear a soft reference without consuming the full amount of resources consumed by an exhaustive analysis. Performing a bounded analysis may provide a balance between more informed decisions about whether the clear soft references and the amount of processing consumed to make those more informed decisions.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readably by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A computer-implemented method for memory management, comprising:
   determining a target amount of heap space to be deallocated for a program by garbage collection during runtime;
   estimating an amount of heap space reachable by each of a plurality of soft references in the program by determining for each of the plurality of soft references a cumulative size of no more than N objects reachable from the respective soft reference, wherein N is an integer greater than zero; and
   deallocating heap space based on at least the target amount of heap space to deallocate and the amount of heap space reachable by the plurality of soft references.

2. The computer-implemented method of claim 1, wherein said deallocating heap space based on at least the target amount of heap space to deallocate and the amount of heap space reachable by the plurality of soft references comprises:
   clearing at least one of the plurality of soft references based on at least the target amount of heap space to deallocate and the amount of heap space reachable by the at least one of the plurality of soft references.

3. The computer-implemented method of claim 2, wherein said clearing at least one of the plurality of soft references based on at least the target amount of heap space to deallocate and the amount of heap space reachable by the at least one of the plurality of soft references comprises:
   clearing least-recently-used soft references of the plurality of soft references until a total amount of heap space reachable by the cleared least-recently-used soft references is at least equal to the target amount of heap space to deallocate.

4. The computer-implemented method of claim 2, wherein said clearing at least one of the plurality of soft references based on at least the target amount of heap space to deallocate and the amount of heap space reachable by the at least one of the plurality of soft references comprises:
   clearing soft references of the plurality of soft references when the amount of heap space reachable by each of the soft references of the plurality of soft references is at least as large as the amount of heap space reachable by other soft references of the plurality of soft references until a total amount of heap space reachable by the cleared soft references is at least equal to the target amount of heap space to deallocate.

5. The computer-implemented method of claim 1, wherein said estimating the amount of heap space reachable by each of the plurality of soft references comprises:
   determining an excluded set of objects in the program that are in use; and
   determining the cumulative size of no more than N objects reachable from the respective soft reference and not in the excluded set of objects.

6. The computer-implemented method of claim 5, wherein said estimating the amount of heap space reachable by each of the plurality of soft references further comprises:
   if the cumulative size is the size of fewer than N objects, determining that the cumulative size is accurate; and
   if the cumulative size is the size of N objects, determining that the cumulative size is not accurate.

7. The computer-implemented method of claim 6, wherein said estimating the amount of heap space reachable by each of the plurality of soft references further comprises:
   estimating the amount of heap space reachable by the respective soft reference as the cumulative size when the cumulative size is not accurate.

8. The computer-implemented method of claim 6, wherein said estimating the amount of heap space reachable by each of the plurality of soft references further comprises:
  if the cumulative size is not accurate, estimating the amount of heap space reachable by the respective soft reference as the cumulative size multiplied by a scaling factor.

9. The computer-implemented method of claim 6, wherein the scaling factor is determined by dividing an actual amount of heap space deallocated by at least one previous garbage collection cycle by a previous total estimated heap space reachable by at least one cleared soft reference that was cleared by the at least one previous garbage collection cycle.

10. The computer-implemented method of claim 6, wherein said estimating the amount of heap space reachable by each of the plurality of soft references further comprises:
  if the cumulative size is not accurate, estimating the amount of heap space reachable by the respective soft reference as a constant.

11. The computer-implemented method of claim 1, wherein said determining a target amount of heap space to be deallocated for a program by garbage collection during runtime comprises:
  setting the target amount of heap space to be deallocated equal to a fixed size.

12. The computer-implemented method of claim 1, wherein said determining a target amount of heap space to be deallocated for a program by garbage collection during runtime comprises:
  setting the target amount of heap space to be deallocated equal to a percentage of the heap space.

13. The computer-implemented method of claim 1, wherein said determining a target amount of heap space to be deallocated for a program by garbage collection during runtime comprises:
  setting the target amount of heap space to be deallocated equal to a percentage of free space in the heap space.

14. The computer-implemented method of claim 1, wherein the garbage collection comprises at least one of parallel garbage collection, concurrent garbage collection, copying garbage collection, compacting garbage collection, tracing garbage collection, non-moving garbage collection, mark-sweep garbage collection, generational garbage collection, stop-the-world garbage collection, incremental garbage collection, and single-threaded garbage collection.

15. The computer-implemented method of claim 1, wherein the garbage collection comprises single-threaded, mark-sweep garbage collection and said estimating the amount of heap space reachable by each of the plurality of soft references comprises:
  marking objects in the program that are in use; and
    determining a cumulative size of no more than N unmarked objects reachable from each of the plurality of soft references.

16. The computer-implemented method of claim 15, wherein said cumulative size of no more than N unmarked objects reachable from each of the plurality of soft references comprises:
  for each of the plurality of soft references, determining the cumulative sum by summing a size of each of the no more than N unmarked objects reachable from the respective soft reference.

17. The computer-implemented method of claim 16, wherein said determining the cumulative sum by summing a size of each of the no more than N unmarked objects reachable from the respective soft reference comprises:
  for each of the no more than N unmarked objects reachable from the respective soft reference, performing the operations of:
    selecting an unmarked object that is reachable from the respective soft reference;
    marking the object;
    listing the object in a visited object list by adding an address for the object to an N element array; and
    adding an object size of the object to an accumulator for the respective soft reference.

18. The computer-implemented method of claim 16, wherein said determining the cumulative sum by summing a size of each of the no more than N unmarked objects reachable from the respective soft reference further comprises:
  unmarking objects listed in the visited object list.

19. A system, comprising:
  a processing unit that performs garbage collection for a program during runtime; and
  a memory, communicably coupled to the processing unit, wherein the processing unit is operable to determine a target amount of heap space to be deallocated for the program by the garbage collection, estimate an amount of heap space reachable by each of a plurality of soft references in the program by determining for each of the plurality of soft references a cumulative size of no more than N objects reachable from the respective soft reference, and deallocate heap space based on at least the target amount of heap space to deallocate and the amount of heap space reachable by the plurality of soft references; wherein N is an integer greater than zero.

20. A computer program product, including a computer readable storage medium and instructions executable by a processing unit tangibly embodied in the computer readable storage medium, the instructions comprising:
  a first set of instructions for determining a target amount of heap space to be deallocated for a program by garbage collection during runtime;
  a second set of instructions for estimating an amount of heap space reachable by each of a plurality of soft references in the program by determining for each of the plurality of soft references a cumulative size of no more than N objects reachable from the respective soft reference, wherein N is an integer greater than zero; and
  a third set of instructions for deallocating heap space based on at least the target amount of heap space to deallocate and the amount of heap space reachable by the plurality of soft references.

* * * * *